(12) United States Patent
Winter et al.

(10) Patent No.: US 6,781,559 B2
(45) Date of Patent: Aug. 24, 2004

(54) SUPPORT FOR AN ADJUSTABLE HOUSING

(75) Inventors: Klaus Winter, Schwieberdingen (DE); Thomas Klaas, Ludwigsburg (DE); Bernhard Lucas, Besigheim (DE); Thomas Beez, Weinsberg (DE); Oliver Wackerl, Kirchheim an der Teck (DE)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 10/285,738

(22) Filed: Oct. 30, 2002

(65) Prior Publication Data
US 2003/0132891 A1 Jul. 17, 2003

(30) Foreign Application Priority Data
Nov. 2, 2001 (DE) .......................... 101 54 079

(51) Int. Cl.⁷ ............................ H01Q 1/08; F16G 11/00
(52) U.S. Cl. ........................ 343/880; 343/713; 403/14
(58) Field of Search .................. 343/880, 711, 343/713; 403/164, 60, 86, 111, 14, 54, 55; H01Q 1/08; F16G 11/00

(56) References Cited

U.S. PATENT DOCUMENTS 6,322,275 B1 * 11/2001 Schmidt et al. .............. 403/14
6,618,018 B1 * 9/2003 Sylvester et al. ............ 343/713

FOREIGN PATENT DOCUMENTS

| DE | 199 24 055 | 5/1999 | ............ G12B/9/08 |
| DE | 100 255 01 | 5/2000 | ............ H01Q/3/08 |

* cited by examiner

Primary Examiner—Don Wong
Assistant Examiner—Trinh Do Dinh
(74) Attorney, Agent, or Firm—Kenyon & Kenyon

(57) ABSTRACT

A support for an adjustable sensor housing, in particular for a radar sensor, in which the position of the sensor housing on the support is changeable using at least one adjusting screw. The at least one adjusting screw is able to be rotated using a regulatable adjusting drive, and for adjustment of the sensor housing there is an electronic control system present which conveys adjustment signals to the particular adjusting drive. A plug-in connection for a bus connection of the control unit electronics for communication with a higher-level bus system is present, and a compact support housing is constructed in which the electronic control system, the at least one adjusting drive and the plug-in connection are accommodated, and from which attachment points of the adjusting screws for the adjustable sensor housing protrude.

7 Claims, 1 Drawing Sheet

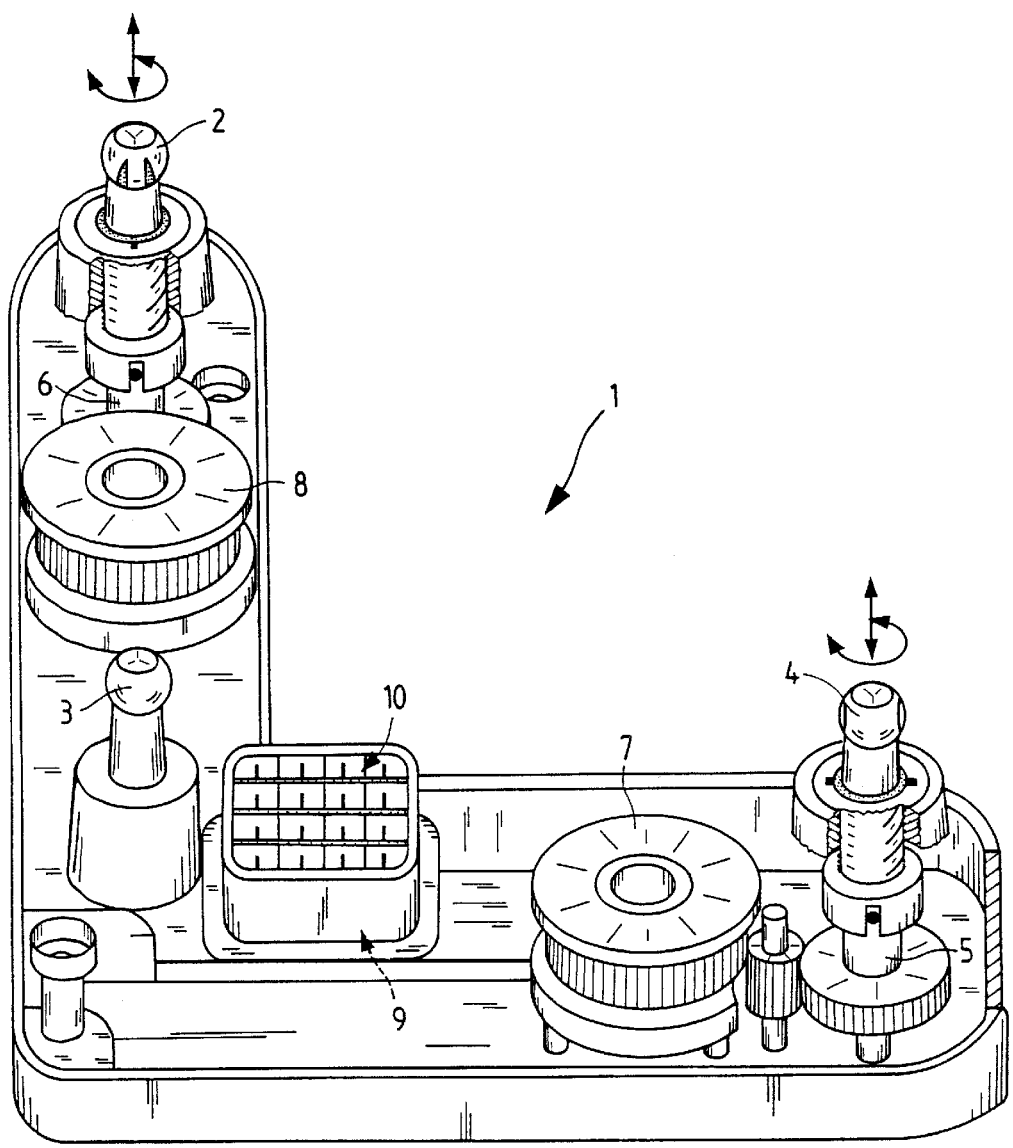

SUPPORT FOR AN ADJUSTABLE HOUSING

FIELD OF THE INVENTION

The present invention relates to a support for an adjustable housing, in particular for the housing of a radar sensor which is mounted on the exterior of a motor vehicle.

BACKGROUND INFORMATION

As a rule, such a radar sensor is screwed to the exterior of a vehicle with a support. This radar sensor may be for example a component of a proximity warning system in which information about the proximity and/or the relative speed of the vehicle relative to other vehicles and to the road conditions is processed continuously. It is necessary in that case to align the radar sensor very precisely with the longitudinal axis of the vehicle, so horizontal and vertical adjustment of the sensor is necessary after installation in the vehicle because of the vehicle tolerances in the area of the mounting location which are to some extent considerable.

It is described for example in German Patent Application No. 199 24 055 that the radar sensor is adjusted from above, below, or laterally after installation by manually turning two adjusting screws with the help of a redirecting mechanism. The difficulty is to find an installation space for the radar sensor which offers adequate room and satisfies the high frequency requirements and also allows simple, rapid, and thus inexpensive adjustment of the radar sensor at the end of the manufacturing process.

Often the accessibility of the adjusting screws is difficult because of the very cramped space situation in the vehicles, or for reasons of design, so that the adjusting can only be done by using a platform lift or similar aids. Recesses or openings in the area of the bumper, which could facilitate access, cannot be implemented in most cases for design reasons. Special tools, such as bevel gears, are also complex and expensive.

A means of motorized adjustment of the adjusting screws produced by an appropriate electronic control system is described in German Patent Application No. 100 255 019, which has not been published previously.

SUMMARY OF THE INVENTION

A support for an adjustable housing, in which the position of a housing, for example for a radar sensor, is capable of modification using at least one adjusting screw, is provided. The at least one adjusting screw is able to be rotated using a regulatable adjusting drive, and for adjustment of the housing there is an electronic control system present which conveys adjustment signals to the particular adjusting drive.

Also present in an advantageous way is a plug-in connection for a bus connection of the control unit electronics for communication with a higher-level bus system, preferably a CAN bus; the electronic control system, the at least one adjusting drive, and the plug-in connection are accommodated in a compact support housing, and only the attachment points of the adjusting screws for the adjustable sensor housing protrude from the support housing.

According to an advantageous embodiment, the at least one adjusting screw is connected in each case via a rotating spindle to the adjusting drive for linear adjustment of the attachment points, the particular adjusting drive being a stepper motor or a DC motor.

In a particularly advantageous way, the support housing is constructed from two arms at right angles to each other, there being one attachment point for the sensor housing at the end of each arm which may be changed in a straight line by an adjusting motor, and a third unchangeable attachment point at the intersection of the two arms.

According to the present invention it is possible, with a particularly compact design of the support, to perform an automatic adjustment in relatively little time, while the favorable design of the support housing and the absence of the need for access to the adjusting screws allow great flexibility in choosing the installation position.

BRIEF DESCRIPTION OF THE DRAWING

The FIGURE shows an exemplary embodiment of a support according to the present invention for the adjustable housing of a radar sensor on a motor vehicle.

DETAILED DESCRIPTION

A perspective representation of a support housing 1 for a distance sensor constructed as a radar sensor, as is known in principle from the related art mentioned above, is shown in the FIGURE. The radar sensor, not shown here, is mounted adjustably at three attachment points 2, 3, and 4 via support housing 1 for attachment to a motor vehicle.

Attachment points 2, 3, and 4 are the ends of adjusting screws, which form a three-point mount because of their L-shaped arrangement, attachment points 2 and 4 being two movable mounting points for the horizontal and vertical adjustment of the sensor housing, not shown, and attachment point 3 being a fixed mounting point.

Screwing in or out the adjusting screw with attachment point 2 for example in the associated thread engagement range causes the sensor housing to tilt around an axis which passes through the suspension points of attachment points 3 and 4. Screwing in or out the adjusting screw with attachment point 4 in the associated thread engagement range causes the sensor housing to tilt around an axis which passes through the suspension points of attachment points 2 and 3.

Attachment points 2 and 4, described above, are changeable in a straight line by adjusting motors 7 and 8, connected in each case to a rotating spindle, a gear mechanism, or a worm drive 5 and 6. Adjusting motors 7 and 8, implemented for example as stepper motors, may be actuated via an electronic control system 9 located in support housing 1, which may be connected to a CAN bus via a plug-in connection 10.

What is claimed is:

1. A support for an adjustable sensor housing, comprising:
   at least one adjusting screw for changing a position of the sensor housing on the support, each of the at least one adjusting screw having an attachment point;
   at least one regulatable adjusting drive for rotating the at least one adjusting screw;
   an electronic control system for conveying adjustment signals to at least one of the at least one adjusting drive;
   a plug-in connection for a bus connection of the electronic control system for communication with a higher-level bus system; and
   a compact support housing for accommodating the electronic control system, the at least one adjusting drive and the plug-in connection, the at least one attachment point protruding from the compact support housing.

2. The support according to claim 1, wherein each of the at least one adjusting screw is connected via one of a gear mechanism and a worm drive to the at least one adjusting drive for linear adjustment of the at least one attachment point.

3. The support according to claim 1, wherein the at least one adjusting drive includes a stepper motor.

4. The support according to claim 1, wherein the at least one adjusting drive includes a DC motor.

5. The support according to claim 1, wherein the support housing has two arms at right angles to each other, the at least one attachment point including first and second attachment points, one of the first and second attachment points being situated at the end of each arm which may be changed in a straight line by the at least one adjusting drive, the at least one attachment point further including a third unchangeable attachment point at an intersection of the two arms.

6. The support according to claim 1, wherein the bus system is a CAN bus.

7. The support according to claim 1, wherein the sensor housing is a component of a radar sensor which is mounted adjustably on an exterior on a component of a motor vehicle.

* * * * *